United States Patent [19]

Olschewski et al.

[11] Patent Number: 4,522,514
[45] Date of Patent: Jun. 11, 1985

[54] THIN-WALLED BEARING BUSHING PRODUCED BY DEEP DRAWING

[75] Inventors: Armin Olschewski, Schweinfurt; Hermann Hetterich, Heidenfeld; Peter Horling, Mainberg; Berthold Beyfuss, Kaisten, all of Fed. Rep. of Germany

[73] Assignee: SKF Kugellagerfabriken GmbH, Schweinfurt, Fed. Rep. of Germany

[21] Appl. No.: 484,573

[22] Filed: Apr. 13, 1983

[30] Foreign Application Priority Data

Apr. 28, 1982 [DE] Fed. Rep. of Germany ....... 3215718

[51] Int. Cl.³ .............................................. F16C 33/58
[52] U.S. Cl. ................................. 384/569; 308/DIG. 3
[58] Field of Search .................... 308/216, 202, 207 R, 308/DIG. 3, 208; 464/128

[56] References Cited

U.S. PATENT DOCUMENTS

| | | | |
|---|---|---|---|
| 3,677,032 | 7/1972 | Suzuki | 308/216 |
| 4,377,313 | 3/1983 | Olschewski et al. | 308/216 |
| 4,429,926 | 2/1984 | Olschewski et al. | 464/128 |

Primary Examiner—Lenard A. Footland
Attorney, Agent, or Firm—Daniel M. Rosen

[57] ABSTRACT

A thin-walled bearing bushing produced by deep drawing, in particular for the seating of pins in universal joints, including a cylindrical sleeve section with a bottom section closing the sleeve off on one end. One or more concentric depressions are axially pressed in the outer surface of the bottom surface near the resulting sharp peripheral edges. A plurality of indentations, displaced radially inward relative to the depressions and reducing the wall thickness of the bottom section of the bushing, are provided on the outer surface of the bottom section so that the uniform bushing inner surface will have a large axial load-carrying capacity.

17 Claims, 6 Drawing Figures

THIN-WALLED BEARING BUSHING PRODUCED BY DEEP DRAWING

BACKGROUND OF THE INVENTION

The present invention is in a thin-walled bearing bushing produced by deep drawing.

There is known a bearing bushing in which a circumferential groove, concentric to the axis of the bearing bushing, is formed in the outer surface of the bottom section of the bearing bushing during deep drawing of the bushing (U.S. Pat. No. 4,377,313). A relatively sharp peripheral edge is formed between the surface of the sleeve section and the outer surface of the bottom section with minimum pressure. In the event a bearing bushing so formed is used to seat pins in universal joints, the face of the pin slides either directly or by way of an intermediate thrust washer placed on the inner surface of the bottom section of the bearing bushing. The axial carrying capacity of this inner surface depends essentially upon the accuracy of shape (evenness) of the inner surface.

SUMMARY OF THE INVENTION

The object of the invention is to obtain an improved bearing bushing in which the inner surface of the bottom section of the bushing has a high accuracy of shape (evenness) for obtaining an improved axial load-carrying capacity.

The objects of this invention are achieved by forming the bearing bushing such that the inner surface of the bottom section of the bearing bushing has a highly accurate shape, especially in the radially outer region, so that the bottom section has a large effective carrying capacity for supporting the face of the pin or the pin thrust washer. Thus, dangerous overloads, which may develop by concentrated surface stress at local prominences on the inner surface of the bottom section during operation, are avoided. The structurally determining thickness of the bushing bottom section may be produced with small manufacturing tolerances in the deep drawing process. A uniformly narrow guide slot may be maintained between the inner surface of the bottom section and the opposing face of the pin and guide washer. As such, the pin of the universal joint may be seated in the bearing bushing with little axial play.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated a preferred embodiment of the invention.

DESCRIPTION OF THE PREFERRED EMBODIMENT

Figure 1:
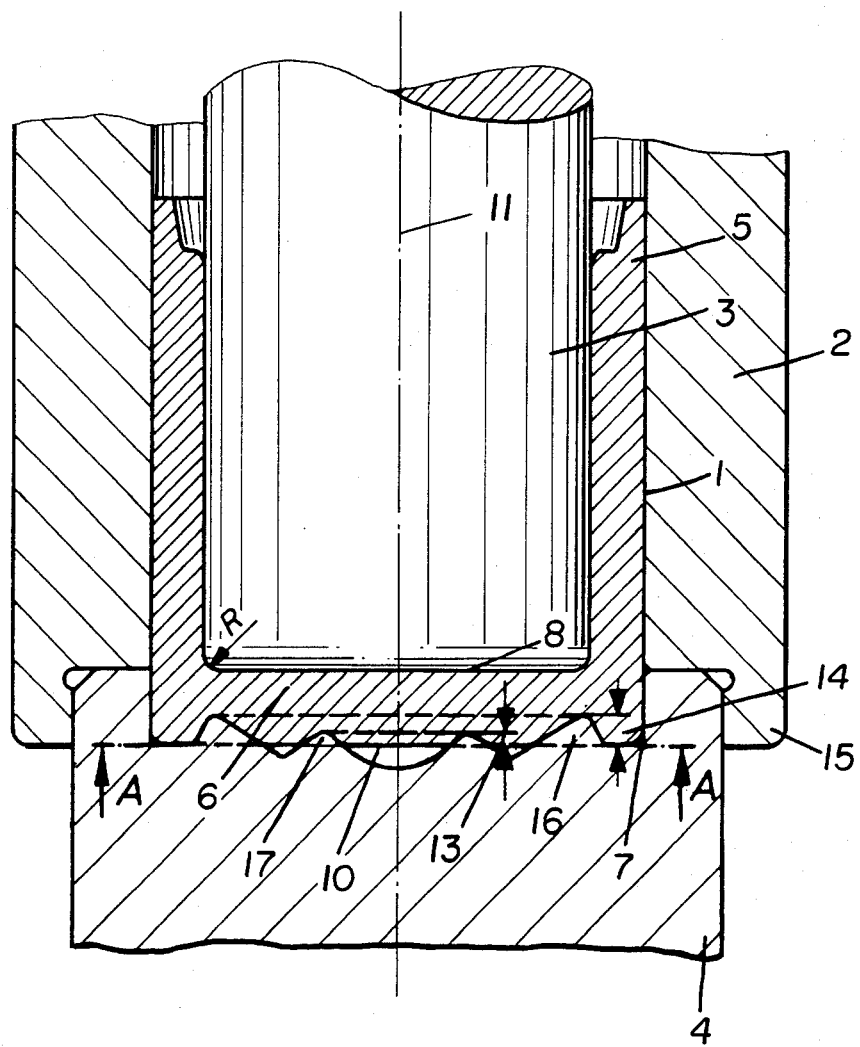
FIG. 1 shows a longitudinal section through a bearing bushing in a drawing die.

Referring to the drawings, FIG. 1 shows a thin-walled bearing bushing 1 and a die 2 for making the bearing bushing 1. The bushing 1 is positioned in the bore of the drawing die 2, in which it is produced with the drawing punch 3 and the counterpunch 4. The drawing process, starting from a round blank cut out of band-shaped material, for example, deep-drawing strip steel, is known per se.

The bearing bushing 1 comprises a cylindrical sleeve section 5 and a bottom section 6 closing the sleeve off at one end. A sharp peripheral edge 7 is formed between the surface of the sleeve section 5 and the outer surface of the bottom section 6. In the present case the bottom section 6 of the bushing 1 has an even inner radial surface 8. A fillet having a relatively large radius of cross-section R serves as a transition for the inner surface 8 to the cylindrical bore surface of the sleeve section 5.

Figure 2:
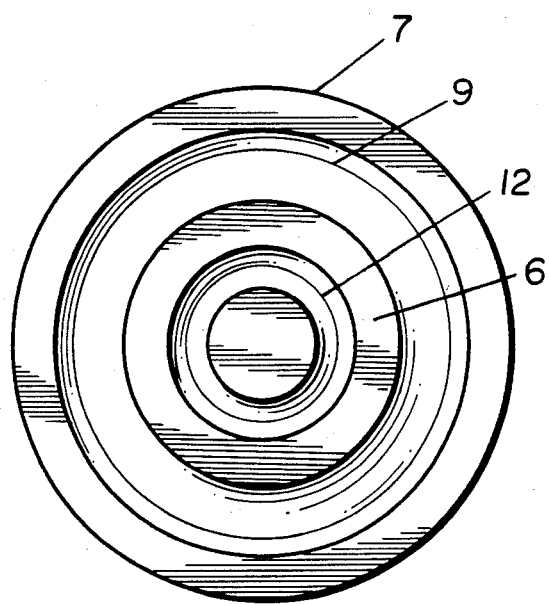
FIG. 2 is a view along line A—A of the outer surface of the bottom section of the bearing bushing of FIG. 1 removed from the drawing die.

A depression 9 (FIG. 2), which is disposed in the vicinity of the peripheral edge 7 and limited radially inward, is pressed axially into the outer surface 10 of the bottom section 6 forming the relatively sharp peripheral edge 7. In the present instance this depression 9 is a groove which is concentric to bushing axis 11 and has an essentially V-shaped cross-section.

The outer surface 10 of the bottom section 6 is also provided with an indentation in the form of circumferential groove 12 displaced radially inward relative to the depression 9 and reducing the wall thickness of the bottom section 6. The groove 12 is concentric with axis 11 of the bearing bushing 1 and has an essentially V-shaped cross-section. The depth 14 of the axial depression 9 of the outer surface 10 of bottom section 6 is greater than the depth 13 of the groove 12. The shape and depth of grooves 9 and 12 are such that the material displacement necessary for formation of an even inner surface of bottom section 6 during deep drawing is ensured.

The depression 9 and the groove 12 are axially impressed on the outer surface 10 of the bearing 1 by corresponding annular projections 16 and 17 of the counterpunch 4 during the deep drawing of the bushing 1 in the drawing die 2 with the centering shoulder 15 for the counterpunch 4. Simultaneously, the flat face of the drawing punch 3 presses against the inner surface 8 so that a smooth, even and accurately shaped inner surface 8 is formed on the bottom section 6 of the bearing bushing 1. A fillet of constant radius R is formed at the periphery between the sleeve section 5 and the bottom section 6.

Figure 3:
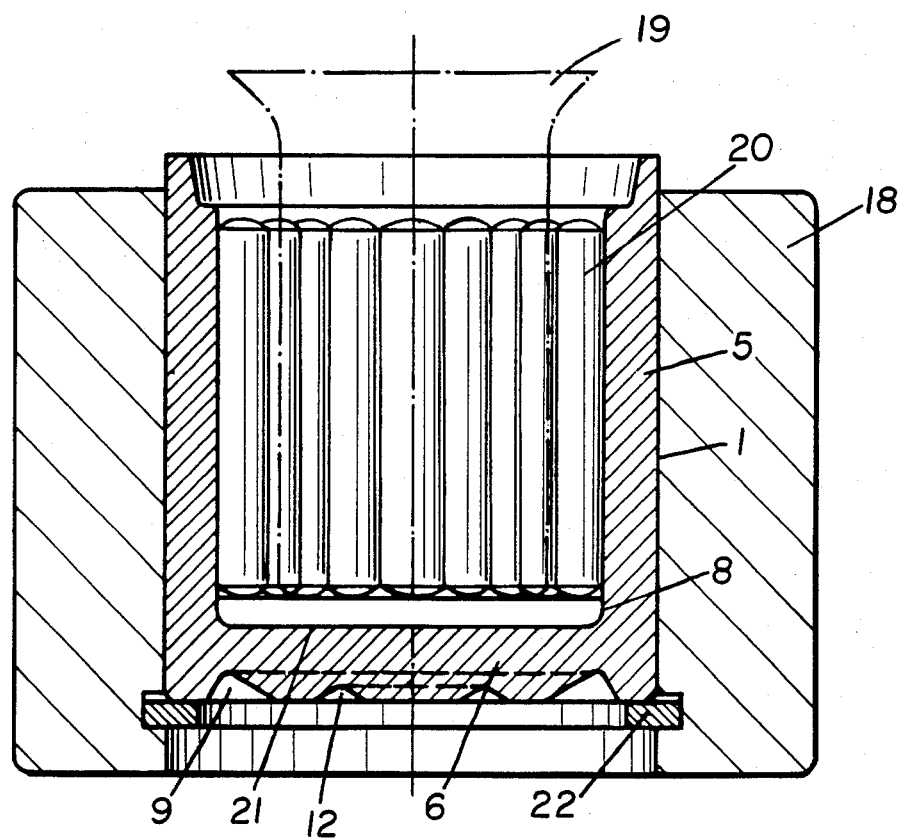
FIG. 3 is a longitudinal section through the bearing bushing of FIG. 1 in the installed state.

FIG. 3 depicts bearing bushing 1 mounted by a firm setting within the bore of fork 18 of a universal joint (not shown). The bearing bushing 1 is axially secured at its bottom section 6 by the snap ring 22, which is snapped into a radial annular groove in the bore of the fork 18. Pin 19 of a cross-piece of the universal joint is indicated by broken lines and is seated within a cylindrical roll member 20. The roll member 20 and the flat of the pin 19 are supported by a thin thrust washer 21 of self-lubricating synthetic material on a smooth even inner surface 8 of the bottom section 6. Since this even inner surface 8 does not have protrusions or blemishes, the developed surface stress on the inner surface 8 of the bottom section 6 is uniformly distributed during operation.

Figure 4:
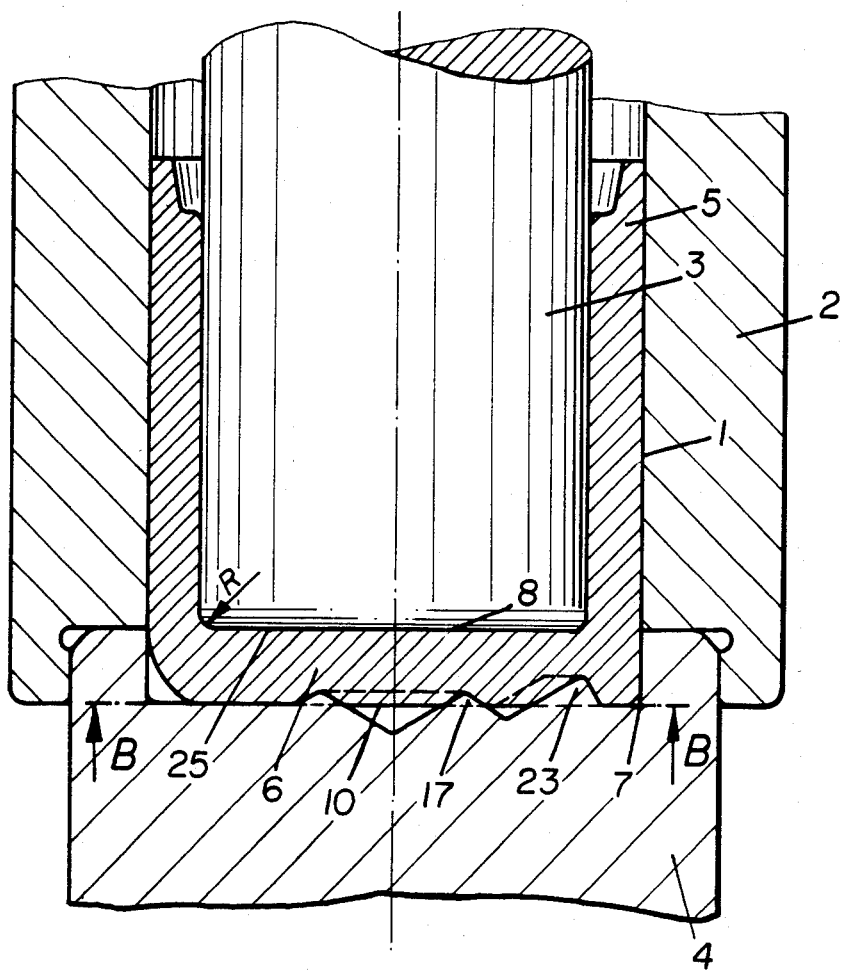
FIG. 4 is a longitudinal section through a modified bearing bushing in a drawing die.
Figure 5:
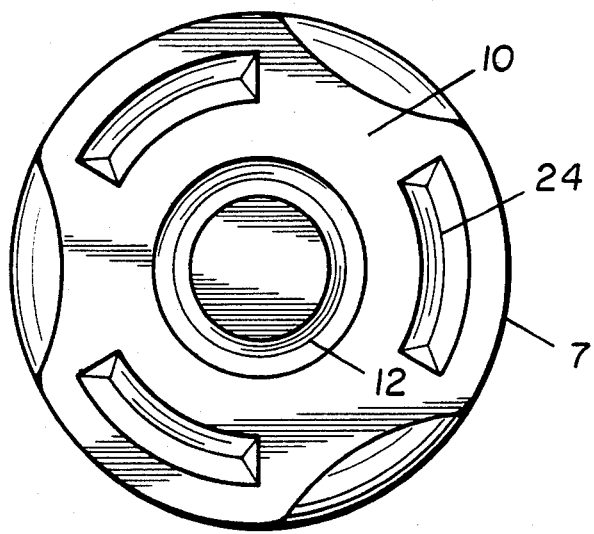
FIG. 5 is a view along line B—B of the outer surface of the bottom section of the bearing bushing of FIG. 4 removed from the drawing die.

FIGS. 4 and 5 show a modified bearing bushing 1, likewise consisting of a cylindrical sleeve section 5 having a bottom section 6 closing off the sleeve on one side. As above, bushing 1 is deep-drawn in the bore of a drawing die 2 with a drawing punch 3 and a counterpunch 4 (FIG. 4). In the present case the counterpunch 4 is formed with three peripherally extending interrupted projections 23 on its face to axially press three radial groove-like depressions 24 onto the outer surface 10 of the bottom section 6. Depressions 24 have a V-shaped cross-section and are disposed in the vicinity of the peripheral edge. The forming of the depressions 24 results in a sharp peripheral edge 7 in the outer radial region. The wall thickness of the bottom section 6 is reduced by an indentation in the form of a concentric circumferential groove 12 having a V-shaped cross-section. The groove 12 is placed radially inward relative to the depressions 24 on the surface of the bottom section 6 of the bushing 1.

The drawing punch 3 has a radially extending flat face 25 which produces an accurately shaped even inner surface 8 on the bottom section 6 of the bearing sleeve 1 by the deep drawing procedure. The fillet between the sleeve section 5 and the bottom section 6 has a constant radius of cross-section R at the periphery.

Figure 6:
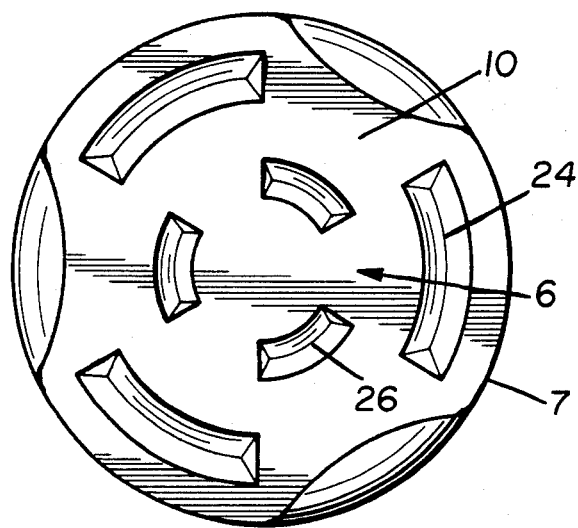
FIG. 6 is a view of the outer surface of the bottom section of an additional modified bearing bushing.

FIG. 6 depicts outer surface 10 of another embodiment of the invention. Three depressions 24 are disposed in the vicinity of the peripheral edge of the outer surface 10. In this embodiment three peripherally disposed grooved sections 26 are positioned radially inward of the depressions 24, in the outer surface 10 of the bottom section 6. These grooved sections 26 have a V-shaped cross-section and are in each instance located intermediate adjacent depressions 24 at the periphery of the bearing bushing.

The bearing bushings described above may be structurally modified within the scope of the invention. For example, the bottom section of the bearing sleeve may alternatively have, in addition to an even inner radial surface 8, an inner surface concentric to the bushing axis and extending outwardly in a conic section. This conical inner surface may then be slidingly supported on a suitably shaped opposing face of the pin of the universal joint.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. In a thin-walled deep-drawn bearing bushing for the seating of pins in universal joints, including a cylindrical sleeve section and a bottom section closing the sleeve section at an end thereof, the bottom section having an outer surface wherein at least one axially pressed recess is formed near the periphery of the outer surface forming a relatively sharp peripheral edge, the improvement comprising the outer surface of the bottom section being formed with at least one recess radially displaced inwardly relative to the nearly peripheral recess, thereby reducing the wall thickness of the bottom section of the bearing bushing.

2. The bearing bushing according to claim 1, wherein the inwardly radially displaced recess is concentrically disposed about a longitudinal axis of the bearing bushing.

3. The bearing bushing according to claim 1, wherein the inwardly radially displaced recess is a circular groove.

4. The bearing bushing according to claim 3, wherein the groove has a V-shaped cross section.

5. The bearing bushing according to claim 1, wherein the inwardly radially displaced recess has a depth which is less than the depth of the nearly peripheral recess.

6. The bearing bushing according to claim 1, wherein the bottom section of the bearing bushing has an even radially extending inner surface.

7. The bearing bushing according to claim 1, wherein the outer surface of the bottom section has a plurality of inwardly radially displaced recesses concentrically disposed about a longitudinal axis of the bearing bushing.

8. The bearing bushing according to claim 7, wherein each of the inwardly radially displaced recesses is an arc-shaped groove symmetrically arranged about a longitudinal axis of the bearing bushing.

9. The bearing bushing according to claim 8, wherein each groove has V-shaped cross section.

10. In a thin-walled deep-drawn bearing bushing for the seating of pins in universal joints, including a cylindrical sleeve section and a bottom section closing the sleeve section at an end thereof, the bottom section having an outer surface wherein an axially pressed recess is formed near the periphery of the outer surface forming a relatively sharp peripheral edge, the improvement comprising the outer surface of the bottom section being formed with a circular recess radially inwardly displaced relative to the nearly peripheral recess, thereby reducing the wall thickness of the bottom section of the bearing bushing.

11. The bearing bushing according to claim 10, wherein the radially inwardly displaced recess is concentrically disposed about a longitudinal axis of the bearing bushing.

12. The bearing bushing according to claim 10, wherein the radially inwardly displaced recess is a groove.

13. The bearing bushing according to claim 12, wherein the groove has a V-shaped cross section.

14. The bearing bushing according to claim 10, wherein the radially inwardly displaced recess has a depth which is less than the depth of the nearly peripheral recess.

15. The bearing bushing according to claim 10, wherein the bottom section of the bearing bushing has an even radially extending inner surface.

16. In a thin-walled deep-drawn bearing bushing for the seating of pins in universal joints, including a cylindrical sleeve section and a bottom section closing the sleeve section at an end thereof, the bottom section having an outer surface wherein a plurality of axially pressed arc-shaped recesses are formed equidistant from and arranged symmetrically about a longitudinal axis of the bearing bushing, the improvement comprising the outer surface of the bottom section being formed with a circular recess radially inwardly displaced relative to the arc-shaped recesses, thereby reducing the wall thickness of the bottom section of the bearing bushing.

17. In a thin-walled deep-drawn bearing bushing for the seating of pins in universal joints, including a cylindrical sleeve section and a bottom section closing the sleeve section at an end thereof, the bottom section having an outer surface wherein a first plurality of axially pressed arc-shaped recesses are formed equidistant from and arranged symmetrically about a longitudinal axis of the bearing bushing, the improvement comprising the outer surface of the bottom section being formed with a second plurality of arc-shaped recesses radially inwardly displaced and concentrically arranged relative to the first plurality of recesses, thereby reducing the wall thickness of the bottom section of the bearing bushing.

* * * * *